March 18, 1969     W. TEN CATE     3,433,063

MEASURING ELEMENT FOR DYNAMOMETERS

Filed Dec. 6, 1965

INVENTOR.
WILHELM TEN CATE

United States Patent Office 3,433,063
Patented Mar. 18, 1969

3,433,063
MEASURING ELEMENT FOR DYNAMOMETERS
Wilhelm Ten Cate, Rijswijk, South Holland, Netherlands, assignor to Nederlandse Organisatie voor Toegepast-Natuurwetenschappelijk Onderzoek ten behoeve van Nijverheid, Handel en Verkeer, The Hague, Netherlands
Filed Dec. 6, 1965, Ser. No. 511,753
Claims priority, application Netherlands, Dec. 10, 1964, 6414342
U.S. Cl. 73—141                                    3 Claims
Int. Cl. G01l 5/12

ABSTRACT OF THE DISCLOSURE

A measuring element for dynamometers comprises a relatively flattened ring having two long sides and two short sides, means to load the ring with the force to be measured at the midpoints of the long sides and perpendicular to the long sides, and strain gauges arranged symmetrically with respect to the line of action of the force to be measured. The short sides of the ring are formed of relatively rigid construction. The strain gauges are mounted on at least one and preferably both of the two long sides of the ring, and are disposed symmetrically with respect to the line of action of the force to be measured.

Figure 1:
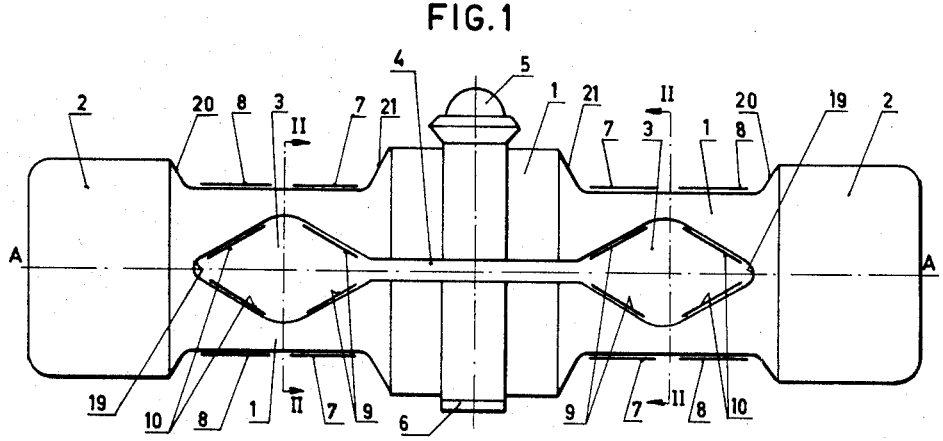

The strain gauges are arranged in pairs, with one gauge of each pair being on the outer surface of the ring and the other gauge of each pair being on the inner surface of the ring, and the two gauges of each pair being directly aligned with each other but on opposite ring surfaces. Each long side of the ring is divided into two sections each connecting the middle portion of the respective long side to a respective short side, and each of the two sections is symmetrical about its midpoint. The strain gauges are arranged with two pairs on each intermediate section of a long side, the two pairs being on opposite sides of the midpoint of the respective intermediate section and at equal distances from the midpoint.

---

The present invention relates to a measuring element for dynamometers of the type comprising a ring having two short sides and two long sides, means to load the ring with the force to be measured at the midpoints of its long sides and perpendicular to its long sides, and strain-gauges arranged symmetrically with respect to the working line or direction of the force to be measured. Such a measuring element is known from British Patent Specification No. 882,989.

In a flat, closed ring, such as used in the known measuring element, the application of the load to be measured develops tension in the ring, and this tension is characterized primarily by a bending moment in the middle parts of the long sides and a bending moment of opposite sign in the ends of the long sides and in the short sides. At the border between the regions having opposite bending moments, there are present, in each of the long sides of the ring, two so-called zero-points of moments, at which no bending moment is present.

As a result of the bending moment in the short sides of the ring, the midpoints or centers of the short sides move along a line perpendicular to the load to be measured, towards each other when this load is a pulling force and away from each other when this load is a compressive force. The zero points of moments in the long sides consequently shift in opposite directions, as a result of the change in distance between the short sides.

The magnitude of the bending moment in a given cross-section of the ring at a given load is determined by the distance from this cross-section to the nearest zero point of moments. With a change of the load, however, the locations of the zero points of moments change, and the locations of the cross sections where the strain gauges are situated also change, the two changes being in opposite directions. Thus, the distance from a cross section to the nearest zero point of moments will change, and the proportion between the load and the bending moments will also change. Thereby, the proportion between the load and the change in electrical resistance of the strain gauges is dependent on the magnitude of the load.

This means a nonlinear relation between the load and the measuring value, and this non-linear relation forms an impediment to accurate measurements, as it requires the application of a calibration curve or the provision of a nonlinear graduation. Also, when a single load is measured by a plurality of measuring elements at the same time, the measuring values of the separate measuring elements cannot just simply be added together.

It is the object of the invention to provide a measuring element in which a high degree of linearity of the relation between the load and the measuring value is obtained, and in which, at the same time, other influences disturbing the measuring value are considerably reduced.

To this end, the measuring element according to the invention is constructed in such a way that the strain-gauges are provided on at least one of the long sides of the ring and that the short sides of the ring are of relatively rigid construction.

A measuring element constructed in such a manner is considerably less nonlinear than the known measuring element, because, owing to the greater rigidity of the short sides, the displacement of the zero points of moments remains small and because these cross-sections provided with strain-gauges are not subjected to any displacement perpendicular to the working line of the load to be measured.

However, deformation of the short sides and the resulting displacement of the zero points of moments, when the load is applied, cannot be entirely avoided. In addition to this, there are other influences that will bring about such displacements.

One of the causes of the displacement of the zero points of moments is the change in the curve of the bending stiffness arising from local differences in temperature, and from the local change in the modulus of elasticity of the material of the ring by which these differences are accompanied. The differences in temperature are unavoidable, because the two parts of the construction, between which the measuring element is positioned, generally have different temperatures, resulting in a temperature gradient across the measuring element.

A displacement of the zero points of moments is caused by the temperature gradient in the ring in yet another way. Owing to the temperature gradient, the two long sides have different temperatures and consequently different relative thermal changes in length. These changes give rise to tensions in the ring, which are characterized principally by a transversal force in the middle of the short sides, accompanied by bending moments of opposite sign in the two long sides. These bending moments bring about a displacement of the zero points of moments.

Displacement of zero points of moments also results from frictional forces at the location where the load to be measured is applied. For example, such frictional forces can result from the negative elongation of the ring through bending and the positive elongation of the thrust pieces through transverse contraction when a tension force is applied. The frictional forces influence the distribution of the tension in the ring and thus influence the location of the zero points of moments. Additionally, the frictional forces are of a very uncertain nature, as they are dependent on various circumstances, and thus reduce the accuracy of the measurements.

Another object of the invention is to eliminate the above-mentioned influences, which adversely influence the accuracy of the measurements. To this end, the measuring element according to the invention is further provided with strain-gauges which are mounted in approximately symmetrical positions on either side of each of the two zero points of moments occurring in a long side at normal load.

The bending moments on either side of a zero point of moments are of opposite signs. For this reason, one of the two strain-gauges positioned on respective opposite sides of the zero point of moments will be subjected to a positive elongation and the other to a negative elongation, accompanied by a positive or a negative change in resistance, respectively. These changes in resistance are added by connecting the two strain-gauges in the adjoining branches of a Wheatstone bridge.

When the zero point of moments shifts as a result of one of the causes mentioned, the increase in the bending moment at location of the one strain-gauge will be equal to the decrease in the bending moment at the location of the other strain-gauge. The result is that the sum of the absolute values of the changes in resistance of the two strain-gauges remains the same, so that the displacement of the zero point of moments has no influence on the measuring result.

In view of this fact, the ring according to the invention is preferably constructed in such a way that, at the locations of corresponding points of two symmetrically positioned strain-gauges, the cross-sections of the ring have equal section module.

For the purpose of preventing shifting of the zero point of the indication of the measuring device as a result of thermal changes in the electrical resistance of the strain gauges, caused by differences in temperature in the ring, the strain gauges are arranged in pairs on the measuring element. The strain gauges of each pair are arranged opposite each other, with one situated on the outer periphery of the ring and the other situated on the inner periphery of the ring. In a particular cross section of the ring, only slight differences in temperature can occur. The two strain gauges of each pair, one of which measures the tension and the other the compression, are thus subjected to substantially the same thermal changes in electrical resistance. As the two strain gauges of each pair are connected in adjoining branches of the measuring bridge, the thermal changes in electrical resistance will have no influence on the output voltage of the bridge.

The slight sensitivity to temperature, which is still possible owing to the small differences in temperature between two strain-gauges positioned on one and the same cross-section of the ring, may be prevented by providing both long sides of the ring with strain-gauges in the manner just described. The slight sensitivity to temperature is thus neutralized because, when there is a stationary temperature field, the difference in temperature across a cross section of one of the long sides of the ring will be equal to the difference in temperature across the corresponding cross section of the other long side of the ring. The two temperature differences, however, are opposite as to sign.

A shifting of the zero point of the indication of the measuring device upon a difference in temperature between the long sides of the ring may also be caused by the bending moment, which is introduced into the long sides by the relative thermal change in length.

In measuring elements having only one long side provided with strain-gauges, this shifting of the zero point is prevented by constructing the ring in such a way that the centers of gravity of these cross-sections where the strain-gauges are situated are positioned on a line which is perpendicular to the working direction of the load to be measured. By this expedient, the centers of gravity are situated at equal distances from the line connecting the mid-points of the short sides and the bending moments resulting from the thermal expansion are thus equal to each other at these locations. Because the bending moments resulting from the load have, at these locations, opposite signs, this source of errors is completely eliminated by the bridge connection of the strain-gauges.

In measuring elements having both the long sides provided with strain-gauges, the aforesaid shifting of the zero point may be successfully prevented in that the ring, at the locations where the strain-gauges are provided is symmetrically constructed relative to the line connecting the mid-points of the short sides. In such case, there will always be cross-sections in which the opposite bending moments are of equal size.

This invention will be further illustrated hereinafter with the aid of the accompanying drawing, showing an embodiment of the measuring element according to the invention.

Figure 2:
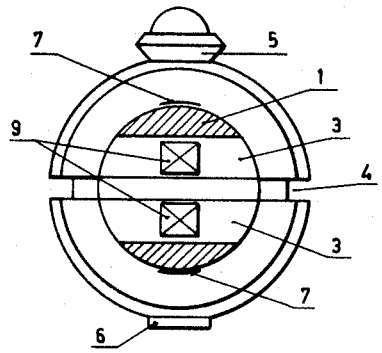

In this drawing:

FIG. 1 shows a front view,

FIG. 2 a cross-section according to one of the lines II—II, and

Figure 3:
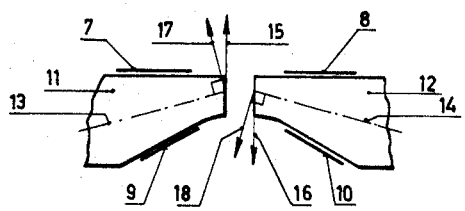

FIG. 3 a detail of the said measuring element.

A flat ring, having two long sides 1 and two short sides 2, has been formed from a solid of revolution, having a center line or axis A—A, by providing the solid with two apertures 3 and a slot 4. Each long sides 1 of this ring has a thickened part in the middle. At this location, there are provided the thrust pieces 5 and 6 with which a compressive force may be exerted on the ring.

When a compressive force is applied to the thrust pieces 5 and 6, there will arise in the ring a distribution of tension, which tension characterized primarily by a bending moment at the middle parts of the long sides 1 and a bending moment of opposite sign at the short sides 2 and the end parts of the long sides 1.

At the locations in the long sides 1 where the regions of opposite bending moments merge into one another, there are present the zero points of moments, which are the cross-sections where no bending moments, but only a transversal force, is present. These zero points of moments are situated near the lines II—II.

On either side of the lines II—II, strain gauges 7 and 8 are provided on the outer periphery, and strain-gauges 9 and 10 are provided on the inner periphery, of the ring. At the locations, where the strain-gauges are positioned, the ring has a shape which is symmetrical with respect to the lines II—II. The positions of the strain-gauges 7 and 8, and 9 and 10, respectively, are also symmetrical with respect to the lines II—II. The strain-gauges 7 and 9, and 8 and 10, respectively, are situated exactly opposite each other.

The strain-gauges are connected in a Wheatstone bridge in a known manner. The strain-gauges 7 and 10, which are subjected to a negative elongation when a compressive force is brought to bear on the ring, are connected in two branches of the bridge situated opposite each other, and the strain-gauges 8 and 9, which as a result of said compression force are subjected to a positive elongation, are connected in the two other branches.

The above-described measuring element offers the possibility of making a correction, when a non-linearity arising from any cause whatsoever is present, or of giving the measuring element a desired non-linearity compensating, for instance, a non-linearity in the remaining apparatus of the measuring device.

For the sake of clarity, FIG. 3 represents the right part of the upper long side 1 of the ring separately and sectioned at the location of the zero point of moments. Those lines of the two parts 11 and 12, on which the centers of gravity of the cross-sections are situated, are indicated at 13 and 14. At the location of the zero point of moments, the transversal force 15 is brought to bear on part 11 and the oppositely directed, equal transversal force 16 on part 12.

The bending caused by the transversal force 15, which is indicated at 17, is perpendicular to the line of centers of gravity 13.

Owing to the line 13 and the transversal force 15 enclosing an angle which is larger than 90°, the bending 17 has a component perpendicular to the direction of the transversal force 15, which component results in a shortening of the effective length of the part 11 and consequentially in a degressive non-linearity of the part 11.

In a corresponding manner, it is found that the part 12 has a progressive nonlinearity, owing to the gravity line 14 with the transversal force 16 enclosing an angle which is smaller than 90°.

When both these nonlinearities have equal shares in the total measuring result, they will neutralize each other. However, when for some reason or other the measuring result shows an undesired nonlinearity, or when it is desired to provide a nonlinearity in the measuring result for the purpose of compensating a nonlinearity which has occurred in the rest of the measuring apparatus, it is possible to make the share of one of the two parts 11 or 12 in the total measuring result larger than that of the other one, so that the nonlinearity of the first part will dominate. As a matter of fact, when material is removed from the ring, for instance at 19 or 20, the zero points of moments will shift in the direction of the short sides 2 having ring, so that the parts of the degressive nonlinearity, on which the strain-gauges 7 and 9 are situated, will now furnish a larger share in the total measuring result. Thus there will be obtained a measuring result having a degressive nonlinearity, or a progressive nonlinearity of the measuring result already present will be compensated.

When material is removed at 21, the zero points of moments will shift in the direction of the middle of the long sides 1 and, the opposite effect is obtained.

In this manner a measuring element of optimal nonlinearity may be obtained.

I claim:

1. In a measuring element for dynamometers of the type comprising a relatively flattened ring having two long sides interconnected by two short sides, means to load the ring, with the force to be measured, at the midpoints of the two long sides and perpendicular to the two long sides, and strain-gauges arranged on the ring symmetrically relative to the line of action of the force to be measured, the improvement in which said ring is substantially symmetrical about a first line interconnecting the midpoints of said two short sides and about a second line interconnecting the midpoints of said two long sides, said short sides are of relatively rigid construction, and the strain-gauges are mounted on at least one of said long sides; the strain-gauges being mounted in approximately symmetrical positions on opposite sides on each of the two zero points of moments occurring in a long side at normal load; the strain-gauges being arranged in pairs, with the two strain-gauges of each pair being exactly opposite each other, one strain-gauge of each pair being located on the outer periphery of the ring and the other strain-gauge of each pair being located exactly opposite the one strain-gauge on the inner periphery of the ring.

2. Measuring element according to claim 1 in which both the long sides of the ring are provided with strain-gauges, and the strain-gauges being arranged symmetrically wtih respect to said first line.

3. In a measuring element for dynamometers of the type comprising a relatively flattened ring having two long sides interconnected by two short sides, means to load the ring, with the force to be measured, at the midpoints of the two long sides and perpendicular to the two long sides, and strain-gauges arranged on the ring symmetrically relative to the line of action of the force to be measured, the improvement in which said ring is substantially symmetrical about a first line interconnecting the midpoints of said two short sides and about a second line interconnecting the midpoints of said two long sides, said short sides are of relatively rigid construction, and the strain-gauges are mounted on at least one of said long sides; the strain-gauges being mounted in approximately symmetrical positions on opposite sides of each of the two zero points of moments occurring in a long side at normal load; each long side having its minimum cross sectional area at its two zero points of moments, the two minimum cross sectional areas being substantially equal in area, and the cross sectional area of each long side increasing substantially uniformly in opposite directions from each of its two zero points of moments.

References Cited

UNITED STATES PATENTS

| | | | |
|---|---|---|---|
| 2,698,371 | 12/1954 | Li | 73—88.5 XR |
| 3,110,175 | 11/1963 | Seed | 73—141 |
| 3,168,718 | 2/1965 | Swartz et al. | 73—88.5 XR |
| 3,213,400 | 10/1965 | Gieb | 338—4 |
| 3,335,381 | 8/1967 | Giovanni | 338—4 |

FOREIGN PATENTS

| | | |
|---|---|---|
| 1,358,104 | 3/1964 | France. |
| 922,982 | 4/1963 | Great Britain. |
| 990,945 | 5/1965 | Great Britain. |

RICHARD C. QUEISSER, *Primary Examiner.*

C. A. RUEHL, *Assistant Examiner.*

U.S. Cl. X.R.

338—5; 307—322; 331—107; 325—451